US010613681B2

(12) United States Patent
Na et al.

(10) Patent No.: US 10,613,681 B2
(45) Date of Patent: Apr. 7, 2020

(54) TOUCH SCREEN HAVING SENSING ELECTRODE HAVING ELECTRICALLY SEPARATED FIRST AND SECOND REGIONS

(71) Applicant: Samsung Display Co., Ltd., Yongin-si (KR)

(72) Inventors: Hyun Jae Na, Yongin-si (KR); Gwang Bum Ko, Yongin-si (KR); Hyoung Wook Jang, Yongin-si (KR); Ye Ri Jeong, Yongin-si (KR); Jeong Yun Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 131 days.

(21) Appl. No.: 15/595,839

(22) Filed: May 15, 2017

(65) Prior Publication Data

US 2017/0344186 A1 Nov. 30, 2017

(30) Foreign Application Priority Data

May 30, 2016 (KR) ........................ 10-2016-0066648

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04112* (2013.01)

(58) Field of Classification Search
CPC ................... G06F 3/0418; G06F 3/044; G06F 2203/04112
USPC .......................................................... 345/174
See application file for complete search history.

(56) References Cited

U.S. PATENT DOCUMENTS

| | | | |
|---|---|---|---|
| 8,284,332 B2 | 10/2012 | Geaghan et al. | |
| 8,970,515 B2 | 3/2015 | Moran et al. | |
| 9,081,453 B2 | 7/2015 | Bulea et al. | |
| 9,182,861 B2 | 11/2015 | Bulea et al. | |
| 9,360,971 B2 | 6/2016 | Barton et al. | |
| 2010/0265210 A1* | 10/2010 | Nakanishi | G02F 1/13338 345/174 |
| 2013/0314374 A1 | 11/2013 | Kim et al. | |

(Continued)

FOREIGN PATENT DOCUMENTS

| | | |
|---|---|---|
| KR | 10-2010-0138964 | 12/2010 |
| KR | 10-2011-0127236 | 11/2011 |

(Continued)

*Primary Examiner* — Jonathan M Blancha
(74) *Attorney, Agent, or Firm* — H.C. Park & Associates, PLC

(57) ABSTRACT

A touch screen including a plurality of first sensing electrode columns having a plurality of first sensing electrodes, the plurality of first sensing electrode columns extending in one direction, and a plurality of second sensing electrode columns alternately disposed with the first sensing electrode columns, the plurality of second sensing electrode columns including a plurality of second sensing electrodes having a plurality of sub-electrodes. Sub-electrodes of one of adjacent second sensing electrodes are electrically connected to sub-electrodes of another of the adjacent second sensing electrodes. At least some of the first sensing electrodes include a first region and a second region electrically separated from the first region.

19 Claims, 9 Drawing Sheets

(56) References Cited

U.S. PATENT DOCUMENTS

| | | | | |
|---|---|---|---|---|
| 2013/0328812 | A1* | 12/2013 | Kim | G06F 3/044<br>345/173 |
| 2014/0152580 | A1* | 6/2014 | Weaver | G06F 3/041<br>345/173 |
| 2014/0192009 | A1* | 7/2014 | Lai | G06F 3/044<br>345/174 |
| 2015/0261348 | A1 | 9/2015 | Jang et al. | |
| 2015/0277655 | A1* | 10/2015 | Kim | G06F 3/0412<br>345/174 |

FOREIGN PATENT DOCUMENTS

| | | |
|---|---|---|
| KR | 10-2013-0131901 | 12/2013 |
| KR | 10-2014-0129134 | 11/2014 |
| KR | 10-2015-0108003 | 9/2015 |

* cited by examiner

TOUCH SCREEN HAVING SENSING ELECTRODE HAVING ELECTRICALLY SEPARATED FIRST AND SECOND REGIONS

CROSS-REFERENCE TO RELATED APPLICATION

This application claims priority from and the benefit of Korean Patent Application No. 10-2016-0066648, filed on May 30, 2016, which is hereby incorporated by reference for all purposes as if fully set forth herein.

BACKGROUND

Field

The invention relates generally to a touch screen, and, more particularly, to a touch screen having a sensing area with improved sensitivity.

Discussion of the Background

A touch screen is used as one type of information input device to be attached to one surface of a display panel or to be integrally formed with the display panel. A user may input information by pressing or touching a touch sensor in the touch screen while viewing an image implemented on the display panel. The touch screen may include a plurality of sensing electrodes and a plurality of sensing lines connecting the sensing electrodes.

The sensing lines may be disposed in a region between adjacent sensing electrodes. As consumer demand for smaller and higher resolution displays has increased, the number of the sensing lines disposed in the region between the adjacent sensing electrodes has increased, along with a corresponding increase in the density of the sensing lines.

The above information disclosed in this Background section is only for enhancement of understanding of the background of the inventive concepts, and, therefore, it may contain information that does not form the prior art that is already known in this country to a person of ordinary skill in the art.

SUMMARY

Applicants have discovered that electromagnetic interference may occur between the sensing electrodes and the sensing lines in touch screen, and becomes more of a problem as the density of the sensing lines increases. The electromagnetic interference may decrease the touch sensitivity and/or the uniformity of touch sensitivity of the touch screen.

Touch sensors constructed according to the principles of the invention provide a touch screen having improved touch sensitivity and/or more uniform touch sensitivity, even if there are a large number of the sensing lines disposed in the region between the adjacent sensing electrodes. Applicants have discovered ways to reduce or eliminate electromagnetic interference caused by narrowly spaced sensing lines between adjacent sensing electrodes. For example, according to the principles to the invention, the configurations of the sensing electrodes, such as their width, length, shape, number and/or orientation may be reduced or altered to reduce or eliminate electromagnetic interference therebetween and/or provide more uniform touch sensitivity across the various regions of a touch screen. In addition, the sensor electrodes may have electrically isolated portions that vary in size based upon the distance from the pad unit of the touch screen to vary the sensitivity across the screen.

Additional aspects will be set forth in the detailed description which follows, and, in part, will be apparent from the disclosure, or may be learned by practice of the inventive concepts.

According to one aspect of the invention, a touch screen includes a plurality of first sensing electrode columns including a plurality of first sensing electrodes, the plurality of first sensing electrode columns extending in one direction, and a plurality of second sensing electrode columns alternately disposed with the first sensing electrode columns, the plurality of second sensing electrode columns including a plurality of second sensing electrodes having a plurality of sub-electrodes. Sub-electrodes of one of adjacent second sensing electrodes are electrically connected to sub-electrodes of another of the adjacent second sensing electrodes. At least some of the first sensing electrodes include a first region and a second region electrically separated from the first region.

The second region may be disposed in the first region, and be electrically isolated from the first region.

In at least some of the first sensing electrode columns, an area of the second region of one of adjacent first sensing electrodes may be smaller than an area of the second region of another of the adjacent first sensing electrodes.

An area of the second region of the first sensing electrode disposed at one end of the first sensing electrode column may be smaller than an area of the second region of the first sensing electrode disposed at the other end of the first sensing electrode column.

The touch screen may further include a pad unit including a plurality of pads electrically connected to the sub-electrodes of the second sensing electrodes and the first sensing electrodes. The one end of the first sensing electrode column may be an end distant from the pad unit in the first sensing electrode column, and the other end of the first sensing electrode column may be an end proximal to the pad unit in the first sensing electrode column.

The area of the second region of the first sensing electrode disposed at the one end of the first sensing electrode column may be approximately 0.

At least some of the sub-electrodes may include a third region and a fourth region electrically separated from the third region.

The fourth region may be disposed in the third region, and may be electrically isolated from the third region.

In at least some of the second sensing electrode columns, an area of the fourth region of the sub-electrodes of one of adjacent second sensing electrodes may be smaller than an area of the fourth region of the sub-electrodes of another of the adjacent second sensing electrodes.

An area of the fourth region of the sub-electrodes of the second sensing electrode disposed at one end of the second sensing electrode column may be smaller than an area of the fourth region of the sub-electrodes of the second sensing electrode disposed at the other end of the second sensing electrode column.

The touch screen may further include a pad unit including a plurality of pads electrically connected to the sub-electrodes of the second sensing electrodes and the first sensing electrodes. The one end of the second sensing electrode column may be an end disposed distant from the pad unit in the second sensing electrode column, and the other end of the second sensing electrode column may be an end disposed proximal to the pad unit in the second sensing electrode column.

An area of the fourth region of the sub-electrodes of the second sensing electrode disposed at the one end of the second sensing electrode column may be approximately 0.

The second region may include a plurality of electrically separated sub-regions.

In each of the first sensing electrode columns, a sum of areas of the sub-regions of one of adjacent first sensing electrodes may be different from a sum of areas of the sub-regions of another of the adjacent first sensing electrodes.

The touch screen may further include a pad unit including a plurality of pads electrically connected to the sub-electrodes of the second sensing electrodes and the first sensing electrodes. In the first sensing electrode column, a sum of areas of the sub-regions of the first sensing electrode disposed proximal to the pad unit may be smaller than that of areas of the sub-regions of the first sensing electrode disposed distant from the pad unit.

In the first sensing electrode column, areas of adjacent first sensing electrodes may be different from each other. In at least some of the second sensing electrode columns, areas of adjacent second sensing electrodes may be different from each other.

The touch screen may further include a pad unit including a plurality of pads electrically connected to the sub-electrodes of the second sensing electrodes and the first sensing electrodes. In the first sensing electrode column, an area of the first sensing electrode disposed proximal to the pad unit may be larger than that of the first sensing electrode disposed distant from the pad unit. In the second sensing electrode column, an area of the second sensing electrode disposed proximal to the pad unit may be smaller than that of the second sensing electrode disposed distant from the pad unit.

In at least some of the second sensing electrode columns, the second sensing electrodes may include n (where n is a natural number of 2 or more) sub-electrodes. A jth (where j is a natural number of n or less) sub-electrode of one of adjacent second sensing electrodes and an (n−j+1)th sub-electrode of another of the adjacent second sensing electrodes may be electrically connected to each other through a sensing line.

The touch screen may further include a dummy pattern disposed between the first sensing electrode columns and the second sensing electrode columns.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
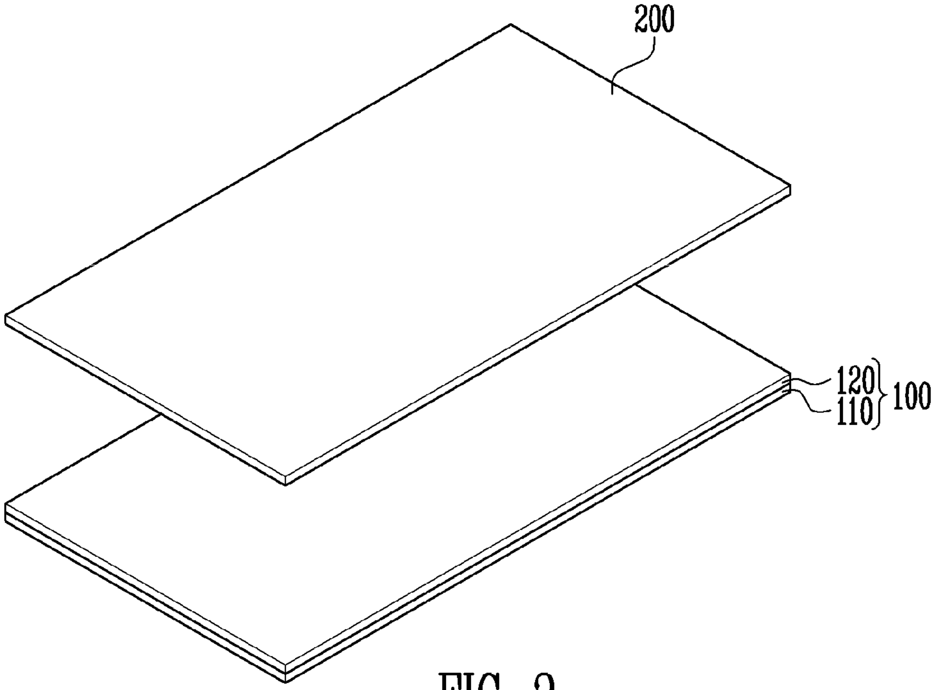
FIG. 1 is an exploded perspective view of a display device including a touch screen constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
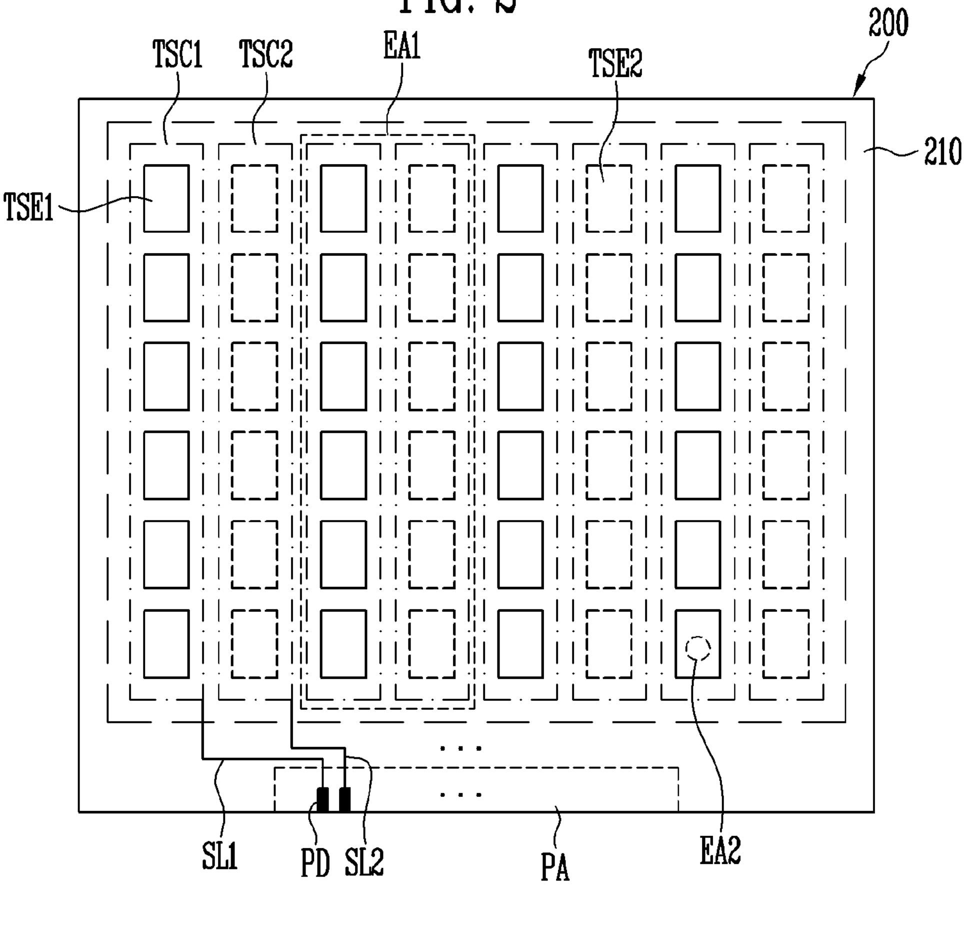
FIG. 2 is a schematic plan view of the touch screen of FIG. 1.
Figure 3:
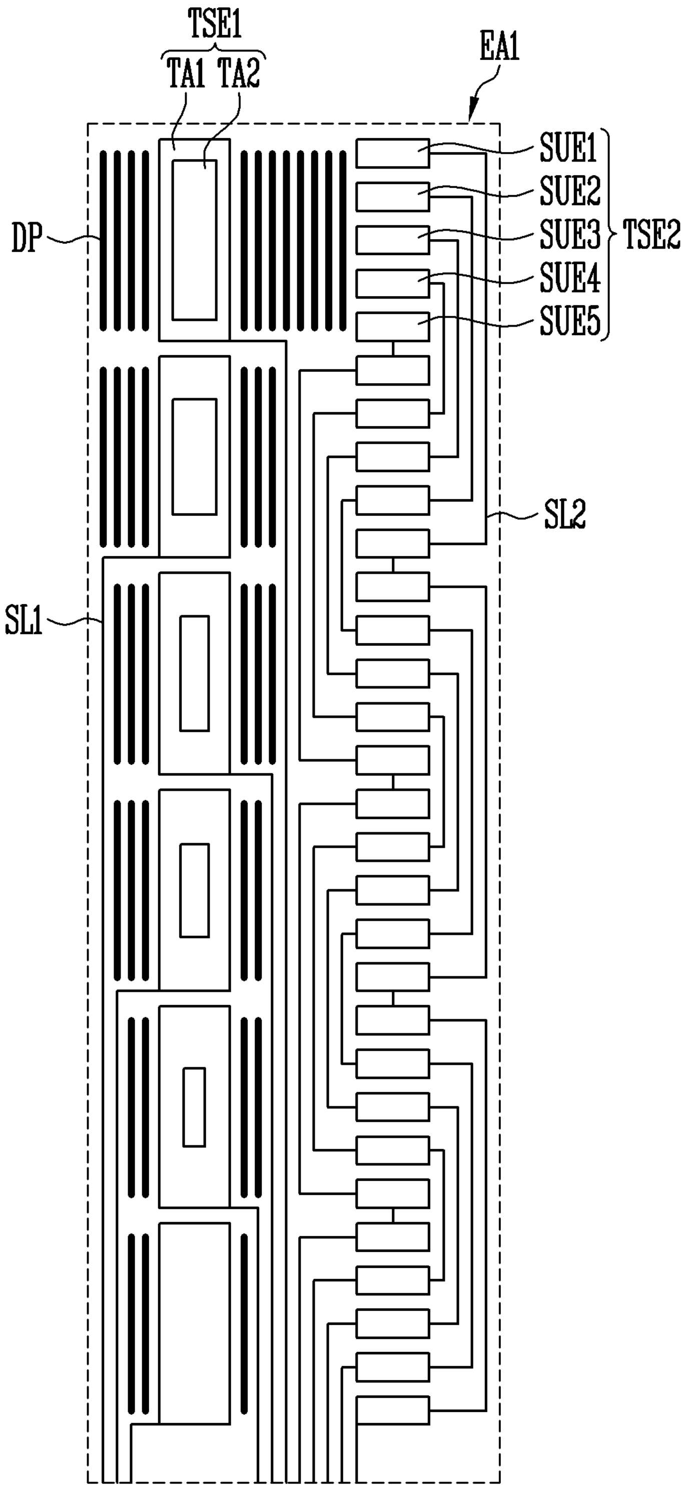
FIG. 3 is an enlarged, schematic plan view of region EA1 of the touch screen of FIG. 2.
Figure 4:
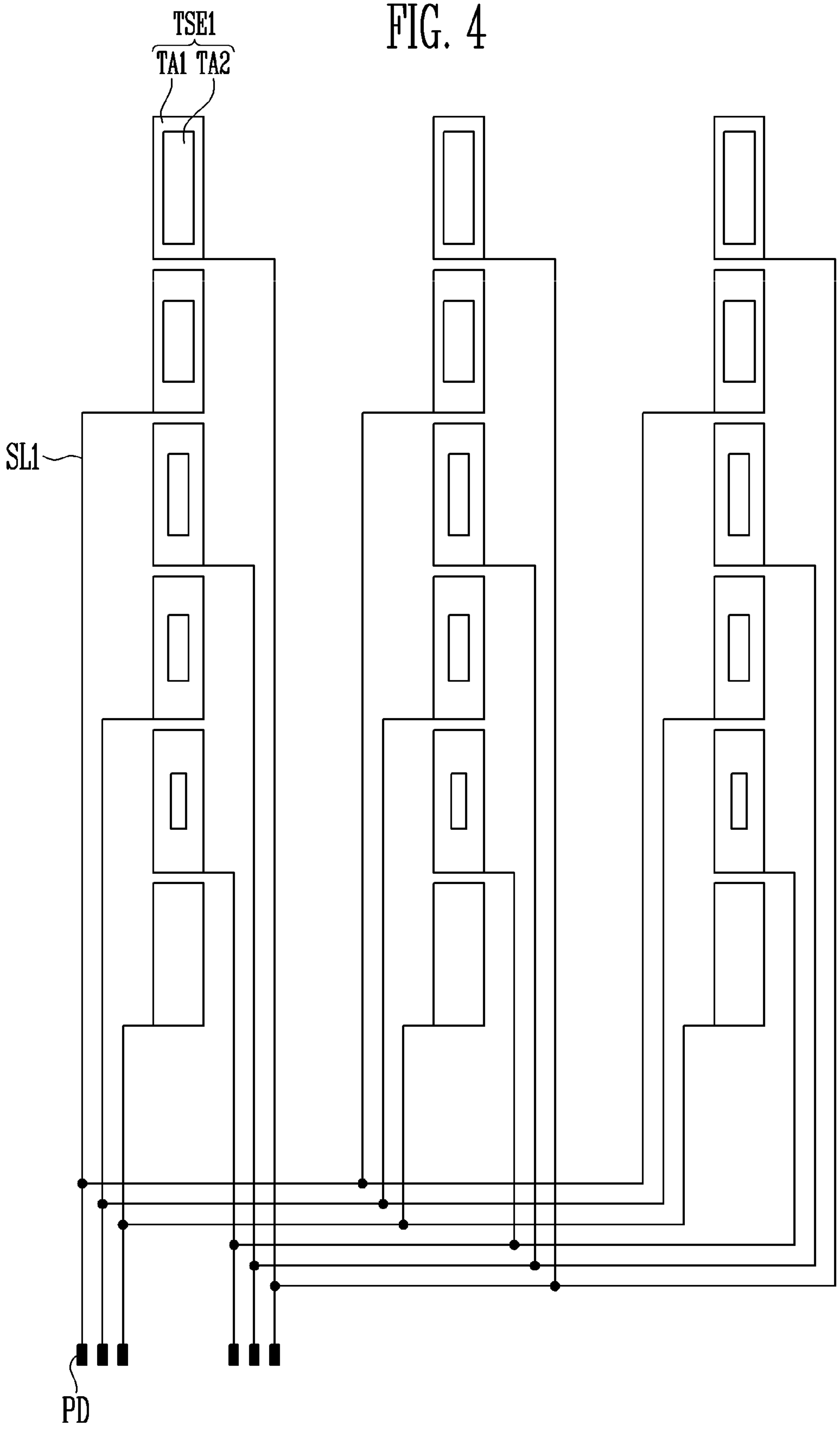
FIG. 4 is an enlarged, schematic plan view of a first embodiment of a first sensing electrode column, first sensing lines, and pads, of the touch screen of FIG. 2.
Figure 5:
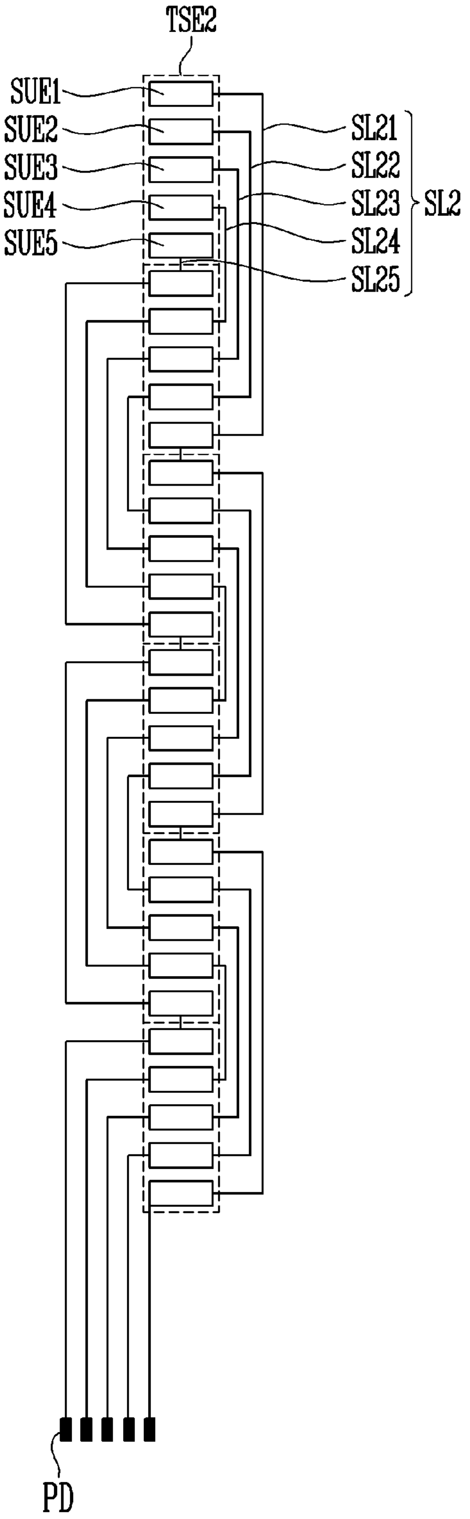
FIG. 5 is an enlarged, schematic plan view of a first embodiment of a second sensing electrode column, second sensing lines, and pads, of the touch screen of FIG. 2.

Referring to FIGS. 1 and 2, the display device may include a display panel 100 and a touch screen 200.

The display panel 100 may display images. The type of display panel 100 is not particularly important. For example, a self-luminescent display device such as an organic light emitting display panel (OLED panel) may be used as the display panel 100. In addition, a non-emissive display panel such as a liquid crystal display panel (LCD) panel, an electro-phoretic display panel (EPD) panel, or an electro-wetting display panel (EWD) panel may be used as the display panel 100. When the non-emissive display panel is used as the display panel 100, the display device may include a back-light unit that supplies light to the display panel 100. For purposes of explaining the illustrative embodiments, the following description pertains to an embodiment in which the OLED panel is used as the display panel 100.

The display panel 100 may include a plurality of pixels. Each of the plurality of pixels may be any one of a red pixel, a green pixel, a blue pixel, and a white pixel, or some other color. For example, the pixel may be any one of a magenta pixel, a cyan pixel, and a yellow pixel.

In addition, the display panel 100 may include a display element disposed in each of the pixels. The display element may be an organic light emitting element. Also, the display panel 100 may include a first substrate 110 on which the organic light emitting element is disposed and a second substrate 120 opposite to the first substrate 110.

The first substrate 110 may include a thin film transistor substrate including at least one thin film transistor disposed on an insulating substrate, and the organic light emitting element connected to the thin film transistor. Also, the first substrate 110 may include a driving unit disposed at one side of the thin film transistor substrate, the driving unit being capable of driving the organic light emitting element. The driving unit may be a chip on glass (COG) type driving element, as is known in the art.

The organic light emitting element is disposed on the thin film transistor substrate. Also, the organic light emitting element may include a first electrode connected to the thin film transistor, an organic layer disposed on the first electrode, and a second electrode disposed on the organic layer. Any one of the first and second electrodes may be an anode electrode, and the other of the first and second electrodes may be a cathode electrode. In addition, at least one of the first and second electrodes may be transparent.

For example, the first electrode may be a conductive layer including any one transparent conductive oxide of indium tin oxide (ITO), indium zinc oxide (IZO), aluminum zinc oxide (AZO), gallium doped zinc oxide (GZO), zinc tin oxide (ZTO), gallium tin oxide (GTO), and fluorine doped tin oxide (FTO). The second electrode may include at least one of Mo, MoW, Cr, Al, AlNd, and Al alloy, which can perform light reflection and have a low work function as compared with the first electrode.

The organic layer at least includes an emitting layer (EML), and may generally have a multi-layered thin film structure. For example, the organic layer may include a hole injection layer (HIL) for injecting holes, a hole transport layer (HTL) having a hole transporting property for increasing the opportunity for holes and electrons to be re-combined by suppressing the movement of electrons that fail to be combined in the EML, which is capable of emitting light through the re-combination of the injected electrons and holes, a hole blocking layer (HBL) for blocking movement of holes not combined in the EML, an electron transport layer (ETL) transporting electrons to the EML, and an electron transport layer (EIL) for injecting electrons.

The color of light generated in the EML may be any one of red, green, blue, and white, or some other color. For example, the color of light generated in the EML may be any one of magenta, cyan, and yellow.

The second substrate 120 isolates the organic light emitting element from an external environment, and may be joined with the first substrate 110 through a sealing material such as a sealant. For example, the second substrate 120 may be a transparent insulating substrate. When the organic light emitting element is sealed by a transparent insulating layer, or the like, the second substrate 120 may be omitted.

The touch screen 200 may be disposed on one surface of the display panel 100, such as a surface in the direction in which an image of the display panel 100 is emitted, to receive a touch input of a user. Also, the touch screen 200 may be integrally formed with the display panel 100. For example, the touch screen 200 may be formed on a surface of at least one of the first substrate 110 and the second substrate 120.

The touch screen 200 may include a base substrate 210 made of a transparent material, a plurality of first sensing electrode columns TSC1 including a plurality of first sensing electrodes TSE1 disposed on the base substrate 210, a plurality of second sensing electrode columns TSC2 alternately disposed with the first sensing electrode columns TSC1, the plurality of second sensing electrode columns TSC2 including a plurality of second sensing electrodes TSE2, a plurality of first sensing lines SL1 connected to the first sensing electrodes TSE1, a plurality of second sensing lines SL2 connected to the second sensing electrodes TSE2, and a pad unit PA electrically connecting the first sensing electrodes TSE1 and the second sensing electrodes TSE2 to an external driving circuit through the first sensing lines SL1 and the second sensing lines SL2.

The base substrate 210 may include a transparent insulating material. For example, the base substrate 210 may include one or more flexible materials selected from polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), cellulose triacetate (TAC), and cellulose acetate propionate (CAP). Also, the base substrate 210 may include one rigid material selected from glass and/or tempered glass.

Both of the first sensing electrode columns TSC1 and the second sensing electrode columns TSC2 may extend in substantially the same direction, i.e., the columns may be substantially parallel. In addition, the first sensing electrodes TSE1 may be arranged in the direction in which the first sensing electrode columns TSC1 extend, and the second sensing electrodes TSE2 may be arranged in the direction in which the second sensing electrode columns TSC2 extend.

The first sensing electrodes TSE1 and the second sensing electrodes TSE2 may sense a change in capacitance from a touch input of a specific object such as a body of the user or a stylus pen. Also, the first sensing electrodes TSE1 and the second sensing electrodes TSE2 may include a conductive material capable of sensing the change in capacitance, as is known in the art.

The first sensing lines SL1 and the second sensing lines SL2 may transmit the change in capacitance, sensed by the first sensing electrodes TSE1 and the second sensing electrodes TSE2, to the external driving circuit through the pad unit PA. Also, like the first sensing electrodes TSE1 and the second sensing electrodes TSE2, the first sensing lines SL1 and the second sensing lines SL2 may include a conductive material.

The pad unit PA may include a plurality of pads PD. The pads PD may be electrically connected to the first sensing electrodes TSE1 and the second sensing electrodes TSE2 through the first sensing lines SL1 and the second sensing lines SL2.

Referring to FIGS. 2 to 6, the touch screen 200 may include a plurality of first sensing electrode columns TSC1 extending in one direction, the plurality of first sensing electrode columns TSC1 being substantially parallel to one another, and a plurality of second sensing electrode columns TSC2 extending in substantially parallel to the first sensing electrode columns TSC1, the plurality of second sensing electrode columns TSC2 being alternately disposed with the first sensing electrode columns TSC1.

The first sensing electrode columns TSC1 may include a plurality of first sensing electrodes TSE1. For example, one first sensing electrode column TSC1 may include I (where I is a natural number of 2 or more) first sensing electrodes TSE1. The first sensing electrodes TSE1 may be arranged in the direction in which the first sensing electrode columns TSC1 extend.

The first sensing electrodes TSE1 may be connected to first sensing lines SL1, respectively. Therefore, the number of first sensing lines SL1 corresponding to the one first sensing electrode column TSC1 may be I. The first sensing lines SL1 may be disposed in regions between the first sensing electrode columns TSC1 and the second sensing electrode columns TSC2.

The first sensing lines SL1 may be alternately disposed at left and right sides of the first sensing electrode columns TSC1. For example, the first sensing line SL1 connected to one of the adjacent first sensing electrodes TSE1 may be disposed at the right side of the first sensing electrode column TSC1. In addition, the first sensing line SL1 connected to another of the adjacent first sensing electrode TSE1 may be disposed at the left side of the first sensing electrode column TSC1. Therefore, numbers of the first sensing lines SL1 disposed in the regions between the first sensing electrode columns TSC1 and the second sensing electrode columns TSC2 may be the same.

The first sensing lines SL1 connected to first sensing electrodes TSE1 disposed at the same position in the first sensing electrode columns TSC1 may be electrically connected to one another. For example, ith (where i is a natural number smaller than I) first sensing lines SL1 connected to ith first sensing electrodes TSE1 in the first sensing electrode columns TSC1 may be electrically connected to one another. Accordingly, the first sensing lines SL1 connected to first sensing electrodes TSE1 disposed at the same position in the first sensing electrode columns TSC1 can be electrically connected to the same pad PD of the pads PD of the pad unit PA.

As the first sensing lines SL1 connected to first sensing electrodes TSE1 disposed at the same position in the first sensing electrode columns TSC1 are electrically connected to one another, the number of first sensing lines SL1 may be equal to the same number of the first sensing electrodes TSE1 included in the first sensing electrode column TSC1. Thus, the number of pads PD electrically connected to the first sensing electrodes TSE1 can be decreased.

The second sensing electrode columns TSC2 may include a plurality of second sensing electrodes TSE2. For example, one second sensing electrode column TSC2 may include an m (where m is a natural number of 2 or more) second sensing electrodes TSE2. The second sensing electrodes TSE2 may be arranged in the direction in which the second sensing electrode columns TSC2 extend.

Each of the second sensing electrodes TSE2 may include a plurality of sub-electrodes, e.g., n (where n is a natural number of 2 or more) sub-electrodes SUE1, SUE2, SUE3, SUE4, and SUE5, which are spaced apart from each other. For example, each of the second sensing electrodes TSE2 may include five sub-electrodes SUE1, SUE2, SUE3, SUE4, and SUE5. That is, each of the second sensing electrodes TSE2 may include a first sub-electrode SUE1, a second sub-electrode SUE2, a third sub-electrode SUE3, a fourth sub-electrode SUE4, and a fifth sub-electrode SUE5. Here, first to fifth sub-electrodes SUE1, SUE2, SUE3, SUE4, and SUE5 may be sequentially disposed in a direction and order progressively coming closer to the pad unit PA. That is, the first sub-electrode SUE1 of the sub-electrodes SUE1, SUE2, SUE3, SUE4, and SUE5 may be disposed most distant from the pad unit PA, and the fifth sub-electrode SUE1 of the sub-electrodes SUE1, SUE2, SUE3, SUE4, and SUE5 may be disposed closest to the pad unit PA.

The sub-electrodes SUE1, SUE2, SUE3, SUE4, and SUE5 may be connected to second sensing lines SL2. The second sensing lines SL2 may be disposed in regions between the first sensing electrode columns TSC1 and the second sensing electrode columns TSC2. In addition, the sub-electrodes SUE1, SUE2, SUE3, SUE4, and SUE5 of one of adjacent second sensing electrodes TSE2 may be electrically connected to the sub-electrodes SUE1, SUE2, SUE3, SUE4, and SUE5 of another of the adjacent second sensing electrodes TSE2 through the second sensing lines SL2, respectively.

This configuration is described in more detail. If each of the second sensing electrodes TSE2 includes an n number of sub-electrodes SUE1, SUE2, SUE3, SUE4, and SUE5, a jth (where j is a natural number of n or less) sub-electrode of one second sensing electrode TSE2 may be electrically connected to an (n−j+1)th sub-electrode of an adjacent second sensing electrode TSE2 through a jth second sensing line SL2. Therefore, if the number of sub-electrodes SUE1, SUE2, SUE3, SUE4, and SUE5 included in the second sensing electrode TSE2 is n, the number of second sensing lines SL2 corresponding to one second sensing electrode column TSC2 may be n.

For example, if each of the second sensing electrodes TSE2 includes five sub-electrodes SUE1, SUE2, SUE3, SUE4, and SUE5, the first sub-electrode SUE1 of one second sensing electrode TSE2 and the fifth sub-electrode SUE5 of an adjacent second sensing electrode TSE2 may be electrically connected to each other through a first second sensing line SL21. The second sub-electrode SUE2 of the one second sensing electrode TSE2 and the fourth sub-electrode SUE4 of the adjacent second sensing electrode TSE2 may be electrically connected to each other through a second second sensing line SL22. The third sub-electrode SUE3 of the one second sensing electrode TSE2 and the third sub-electrode SUE3 of the adjacent second sensing electrode TSE2 may be electrically connected to each other through a third second sensing line SL23. The fourth sub-electrode SUE4 of the one second sensing electrode TSE2 and the second sub-electrode SUE2 of the adjacent second sensing electrode TSE2 may be electrically connected to each other through a fourth second sensing line SL24. The fifth sub-electrode SUE1 of the one second sensing electrode TSE2 and the first sub-electrode SUE1 of the adjacent second sensing electrode TSE2 may be electrically connected to each other through a fifth second sensing line SL25. Therefore, the number of second sensing lines SL2 corresponding to each of the second sensing electrode columns TSC2 may be five.

If the number of second sensing electrodes TES2 in one second sensing electrode column TSC2 is m (where m is a natural number of 2 or more), the number of sub-electrodes SUE1, SUE2, SUE3, SUE4, and SUE5 in one second sensing electrode TSE2 is n, and the sub-electrodes SUE1, SUE2, SUE3, SUE4, and SUE5 and the second sensing lines SL2 correspond one by one, the number of second sensing lines SL2 corresponding to the one second sensing electrode column TSC2 may be m×n. If the number of the second sensing electrode columns TSC2 is p, the touch screen may require p×m×n second sensing lines SL2. Therefore, in the regions between the first sensing electrode columns TSC1 and the second sensing electrode columns TSC, the number of the first sensing lines SL1 may increase progressing closer to the pad unit PA. As the number of the first sensing lines SL1 in the regions between the first sensing electrode columns TSC1 and the second sensing electrode columns TSC increases, noise caused by a signal applied to the first sensing lines SL1, and hence a mutual capacitance between the first sensing electrode TSE1 and the second sensing electrode TSE2 may decrease. Therefore, in the touch screen 200, touch sensitivity may decrease progressing closer to the pad unit PA. Also, in the touch sensitivity of the touch screen 200, touch sensitivity in a region more distant from the pad unit PA and a touch sensitivity in a region closer to the pad unit PA may be different from each other.

In the illustrated embodiments, the sub-electrodes SUE1, SUE2, SUE3, SUE4, and SUE5 of adjacent second sensing electrodes TSE2 may be electrically connected through the same second sensing lines SL2. That is, the sub-electrodes SUE1, SUE2, SUE3, SUE4, and SUE5 of adjacent second sensing electrodes TSE2 may share the second sensing lines SL2. Since the number of second sensing lines SL2 corresponding to the second sensing electrode column TSC2 is equal to that of sub-electrodes SUE1, SUE2, SUE3, SUE4, and SUE5 included in each second sensing electrode TSE2, the number of second sensing lines SL2 corresponding to the second sensing electrode column TSC2 may be smaller than the total number of sub-electrodes SUE1, SUE2, SUE3, SUE4, and SUE5 in the second sensing electrode column TSC2.

Thus, the number of second sensing lines SL2 disposed in the regions between the first sensing electrode columns TSC1 and the second sensing electrode columns TSC2 can be decreased, and the area that the second sensing lines SL2 occupy in an active region can be decreased.

When the number of second sensing lines SL2 disposed in the regions between the first sensing electrode columns TSC1 and the second sensing electrode columns TSC2 is decreased, electromagnetic interference between the first and second sensing electrodes TSE1 and TSE2 resulting from their positioning in the second sensing lines SL2 can be decreased. Thus, the touch sensitivity of the touch screen 200 can be improved.

If the number of second sensing lines SL2 disposed in the regions between the first sensing electrode columns TSC1 and the second sensing electrode columns TSC2 is decreased, the area that the second sensing lines SL2 occupy can be decreased. If the area that the second sensing lines SL2 occupy is decreased, the area of the first sensing electrodes TSE1 or the second sensing electrode TSE2 can be increased. If the area that the second sensing lines SL2 occupy is decreased, and the area of the first sensing electrodes TSE1 or the second sensing electrode TSE2 is increased, the touch sensitivity of the touch screen 200 can be improved.

Each of the first sensing electrodes TSE1 of the first sensing electrode column TSC1 may include a first region TA1 and a second region TA2, which are electrically separated from each other. One of the first region TA1 and the second region TA2 may be an electrically isolated region. For example, the second region TA2 is disposed in the first region TA1, and may have an electrically isolated island shape.

The area of the second region TA2 in any one first sensing electrode TSE1 may be different from that of the second region TA2 in another first sensing electrode TSE1. For example, the area of the second region TA2 of a first sensing electrode TSE1 disposed closer to the pad unit PA of adjacent first sensing electrodes TSE1 may be smaller than that of the second region TA2 of a first sensing electrode TSE1 disposed farther from the pad unit PA of the adjacent first sensing electrode TSE1. In addition, the area of the second region TA2 of a first sensing electrode TSE1 disposed closest to the pad unit PA may not only have the smallest area, but that area may be 0. That is, the first sensing electrode TSE1 disposed closest to the pad unit PA might not have the second region TA2.

Therefore, the sensing area of the first sensing electrode TSE1 disposed distant from the pad unit PA of the first sensing electrode TSE1 of the first sensing electrode column TSC1 may be small, and a sensing area of the first sensing electrode TSE1 disposed close to the pad unit PA of the first sensing electrode TSE1 of the first sensing electrode column TSC1 may be large. Accordingly, although the number of first sensing lines SL1 in a region close to the pad unit PA is greater than that of first sensing lines SL1 in a region distant from the pad unit PA in the regions between the first sensing electrode columns TSC1 and the second sensing electrode columns TSC2, differences in mutual capacitance between the first sensing electrodes TSE1 and the sub-electrodes SUE1, SUE2, SUE3, SUE4, and SUE5 according to distances from the pad unit PA can be reduced. Thus, the touch sensitivity of the entire touch screen 200 can become more uniform.

Figure 6:
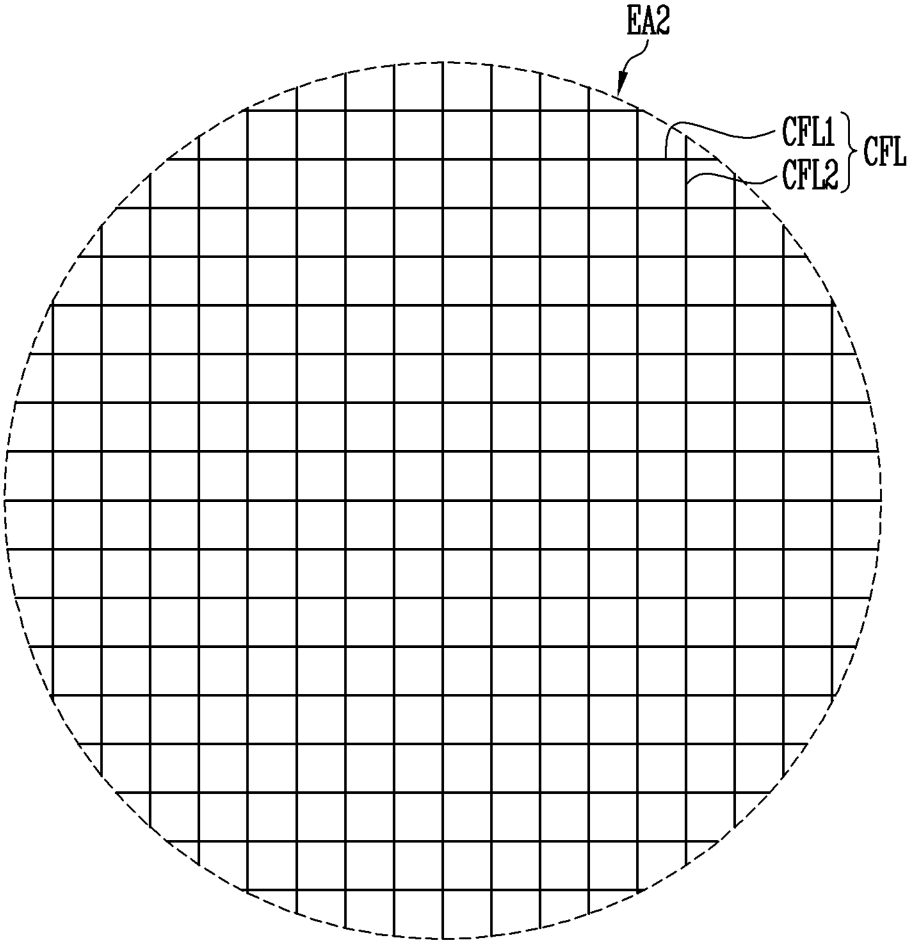
FIG. 6 is an enlarged, schematic plan view of region EA2 of the touch screen of FIG. 2.

As shown in FIG. 6, each of the first sensing electrodes TSE1 and the sub-electrodes SUE1, SUE2, SUE3, SUE4, and SUE5 may include a plurality of conductive fine lines CFL. For example, each of the first sensing electrodes TSE1 and the sub-electrodes SUE1, SUE2, SUE3, SUE4, and SUE5 may include a plurality of first conductive fine lines CFL1 extending in one direction, the plurality of first conductive fine lines CFL1 being substantially parallel to one another, and a plurality of second conductive fine lines CFL2 extending in a direction intersecting the first conductive fine lines CFL1, the plurality of second conductive fine lines CFL2 being substantially parallel to one another. That is, each of the first sensing electrodes TSE1 and the sub-electrodes SUE1, SUE2, SUE3, SUE4, and SUE5 may have a mesh structure.

The mesh structure may include a plurality of openings, e.g., regions formed as the first conductive fine lines CFL1 and the second conductive fine lines CFL2 intersect each other. The openings can decrease an area in which the first sensing electrodes TSE1 and the sub-electrodes SUE1, SUE2, SUE3, SUE4, and SUE5 overlap with the display panel 100. If the area in which the first sensing electrodes TSE1 and the sub-electrodes SUE1, SUE2, SUE3, SUE4, and SUE5 overlap with the display panel 100 is decreased, it is possible to prevent electromagnetic interference between the first sensing electrodes TSE1 and sub-electrodes SUE1, SUE2, SUE3, SUE4, and SUE5 and the display panel 100. Thus, the touch sensitivity of the touch screen 200 can be improved. In addition, if the area in which the first sensing electrodes TSE1 and the sub-electrodes SUE1, SUE2, SUE3, SUE4, and SUE5 overlap with the display panel 100 is decreased, the number of obstacles on a path along which light emitted from the display panel 100 is transmitted to a viewer can be decreased. Accordingly, it is possible to improve the display quality of the display device including the touch screen 200 and the display panel 100.

The first conductive fine lines CFL1 and the second conductive fine lines CFL2 may include at least one of aluminum (Al), copper (Cu), chromium (Cr), nickel (Ni), gold (Au), platinum (Pt), and alloys thereof. Also, the first conductive fine lines CFL1 and the second conductive fine lines CFL2 may include a transparent conductive oxide. Also, the first conductive fine lines CFL1 and the second conductive fine lines CFL2 may include two or more conductive layers.

In addition, a plurality of electrically isolated dummy patterns DP may be disposed in a region in which the sensing lines SL1 and SL2 are not disposed among the regions between the first sensing electrode columns TSC1 and the second sensing electrode columns TSC2. When the dummy patterns DP do not exist, pattern imbalance between a region in which the sensing lines SL1 and SL2 are disposed and a region in which the sensing lines SL1 and SL2 are not disposed (in the regions between the first sensing electrode columns TSC1 and the second sensing electrode columns TSC2) may occur. The region in which the sensing lines SL1 and SL2 are disposed and the region in which the sensing lines SL1 and SL2 are not disposed (in the regions between the first sensing electrode columns TSC1 and the second sensing electrode columns TSC2) may be visibly apparent to a viewer of the display due to the imbalance or inconsistency in the pattern. Thus, the presence of the dummy patterns DP can establish more of a balance or consistency between the lines and thereby prevent the region in which the sensing lines SL1 and SL2 are disposed and the region in which the sensing lines SL1 and SL2 are not disposed (between the first sensing electrode columns TSC1 and the second sensing electrode columns TSC2) from being visibly apparent to a viewer of the display.

Referring now to FIGS. 7 to 10, components identical to those shown in FIGS. 1 to 6 are designated by like reference numerals and will only be briefly described, if at all. Also, in FIGS. 7 to 10, mainly the differences from FIGS. 1 to 6 will be described to avoid redundancy.

Figure 7:
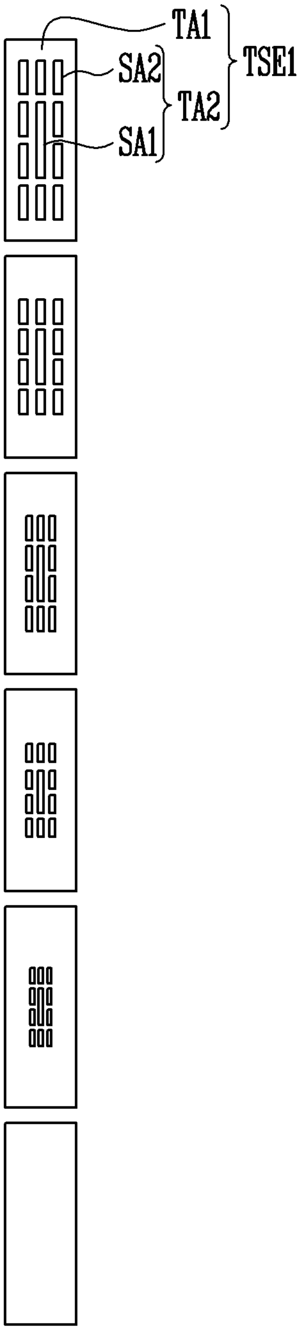
FIG. 7 is an enlarged, schematic plan view of a second embodiment of a first sensing electrode column for use in a touch screen of a display device constructed according to the principles of the invention.

Referring to FIG. 7, the touch screen 200 may include a plurality of first sensing electrode columns TSC1 extending in one direction, the plurality of first sensing electrode columns TSC1 being substantially parallel to one another, and a plurality of second sensing electrode columns TSC2 extending in substantially parallel to the first sensing electrode columns TSC1, the plurality of second sensing electrode columns TSC2 being alternately disposed with the first sensing electrode columns TSC1.

The first sensing electrode columns TSC1 may include a plurality of first sensing electrodes TSE1, and the second sensing electrode columns TSC2 may include a plurality of second sensing electrodes TSE2.

Each of the first sensing electrodes TSE1 may include a first region TA1 and a second region TA2, which are electrically separated from each other. One of the first region TA1 and the second region TA2 may be an electrically isolated region. For example, the second region TA2 is disposed in the first region TA1, and may have an electrically isolated island shape.

In addition, the second region TA2 may include a plurality of sub-regions SA1 and SA2 electrically separated from each other. For example, the second region TA2 may include a first sub-region SA1 and at least one second sub-region SA2 disposed around the first sub-region SA1. The sum of areas of the sub-regions SA1 and SA2 in any one first sensing electrode TSE1 may be different from the sum of the areas of the sub-regions SA1 and SA2 in another first sensing electrode TSE1. For example, the sum of areas of the sub-regions SA1 and SA2 of a first sensing electrode TSE1 disposed closer to the pad unit PA of adjacent first sensing electrodes TSE1 may be smaller than the sum of the areas of the sub-regions SA1 and SA2 of a first sensing electrode TSE1 disposed farther from the pad unit PA of the adjacent first sensing electrodes TSE1. In addition, the sum of areas of the sub-regions SA1 and SA2 of a first sensing electrode TSE1 disposed closest to the pad unit PA may be 0. That is, the first sensing electrode TSE1 disposed closest to the pad unit PA might not have the second region TA2.

Therefore, the sensing area of the first sensing electrode TSE1 disposed farther from the pad unit PA of the first sensing electrodes TSE1 of the first sensing electrode column TSC1 may be smaller, and a sensing area of the first sensing electrode TSE1 disposed closer to the pad unit PA may be larger.

Figure 8:
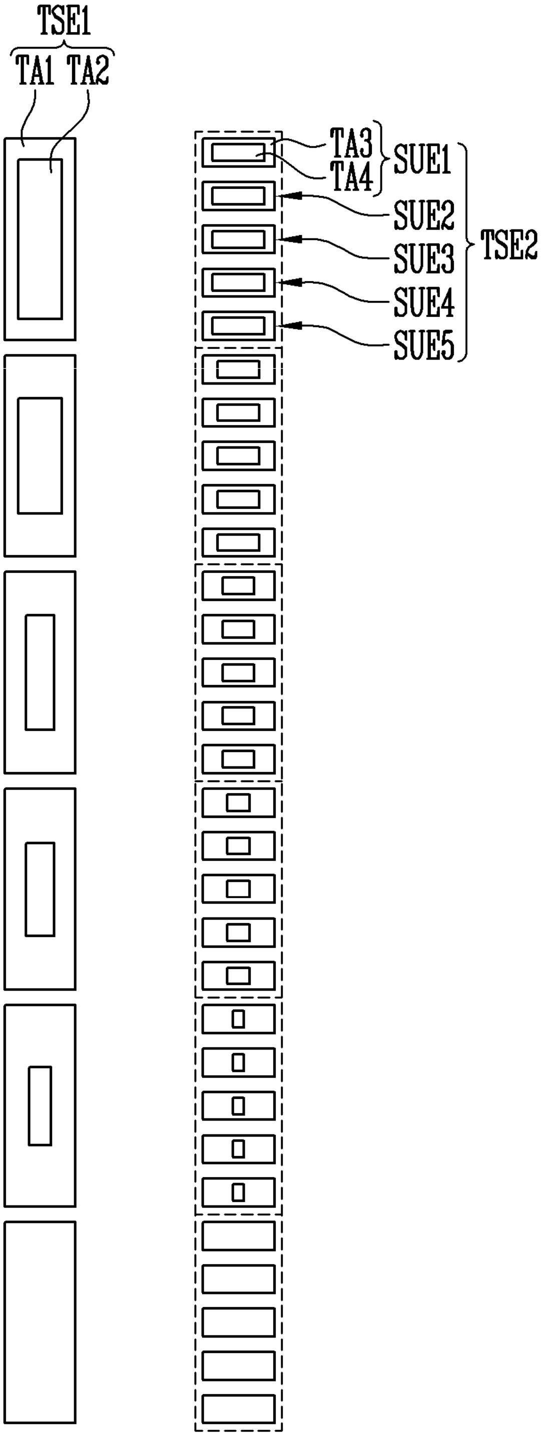
FIG. 8 is an enlarged, schematic plan view of the first embodiment of the first sensing electrode column of FIG. 4 and a second embodiment of a second sensing electrode column for use in a touch screen of a display device constructed according to the principles of the invention.

Referring to FIG. 8, and with the greater perspective of FIG. 2, the touch screen 200 may include a plurality of first sensing electrode columns TSC1 extending in one direction, the plurality of first sensing electrode columns TSC1 being substantially parallel to one another, and a plurality of second sensing electrode columns TSC2 extending in substantially parallel to the first sensing electrode columns TSC1, the plurality of second sensing electrode columns TSC2 being alternately disposed with the first sensing electrode columns TSC1.

The first sensing electrode columns TSC1 may include a plurality of first sensing electrodes TSE1, and the second sensing electrode columns TSC2 may include a plurality of second sensing electrodes TSE2. Each of the second sensing electrodes TSE2 may include a plurality of sub-electrodes SUE1, SUE2, SUE3, SUE4, and SUE5.

Each of the first sensing electrodes TSE1 may include a first region TA1 and a second region TA2, which are electrically separated from each other. One of the first region TA1 and the second region TA2 may be an electrically isolated region. For example, the second region TA2 is disposed in the first region TA1, and may have an electrically isolated island shape.

The area of the second region TA2 in any one first sensing electrode TSE1 may be different from that of the second region TA2 in another first sensing electrode TSE1. For example, the area of the second region TA2 of a first sensing electrode TSE1 disposed closer to the pad unit PA of adjacent first sensing electrodes TSE1 may be smaller than that of the second region TA2 of a first sensing electrode TSE1 disposed farther from the pad unit PA. In addition, the area of the second region TA2 of a first sensing electrode TSE1 disposed closest to the pad unit PA may be 0. That is, the first sensing electrode TSE1 disposed closest to the pad unit PA might not have the second region TA2.

Therefore, the sensing area of the first sensing electrode TSE1 disposed farther from the pad unit PA of the first sensing electrodes TSE1 of the first sensing electrode column TSC1 may be smaller, and the sensing area of the first sensing electrode TSE1 disposed closer to the pad unit PA may be larger.

Each of the sub-electrodes SUE1, SUE2, SUE3, SUE4, and SUE5 may include a third region TA3 and a fourth region TA4, which are electrically separated from each other. One of the third region TA3 and the fourth region TA4 may be an electrically isolated region. For example, the fourth region TA4 is disposed in the third region TA3, and may have an electrically isolated island shape.

The area of the fourth region TA4 in any one second sensing electrode TSE2 may be different from that of the fourth region TA4 in another second sensing electrode TSE2. For example, the area of the fourth area TA4 of a second sensing electrode TSE2 disposed closer to the pad unit PA of adjacent second sensing electrodes TSE2 may be smaller than that of the fourth region TA4 of a second sensing electrode disposed farther from the pad unit PA of the adjacent second sensing electrodes TSE2. In addition, the area of the fourth region TA4 of a second sensing electrode TSE2 disposed closest to the pad unit PA may be 0. That is, the second sensing electrode TSE2 disposed closest to the pad unit PA might not have the fourth region TA4.

Therefore, the sensing area of the sub-electrodes SUE1, SUE2, SUE3, SUE4, and SUE5 of the second sensing electrode TSE2 disposed farther from the pad unit PA of the second sensing electrodes TSE2 of the second sensing electrode column TSC2 may be smaller, and the sensing area of the sub-electrodes SUE1, SUE2, SUE3, SUE4, and SUE5 of the second sensing electrode TSE2 disposed closer to the pad unit PA of the second sensing electrodes TSE2 of the second sensing electrode column TSC2 may be larger.

Figure 9:
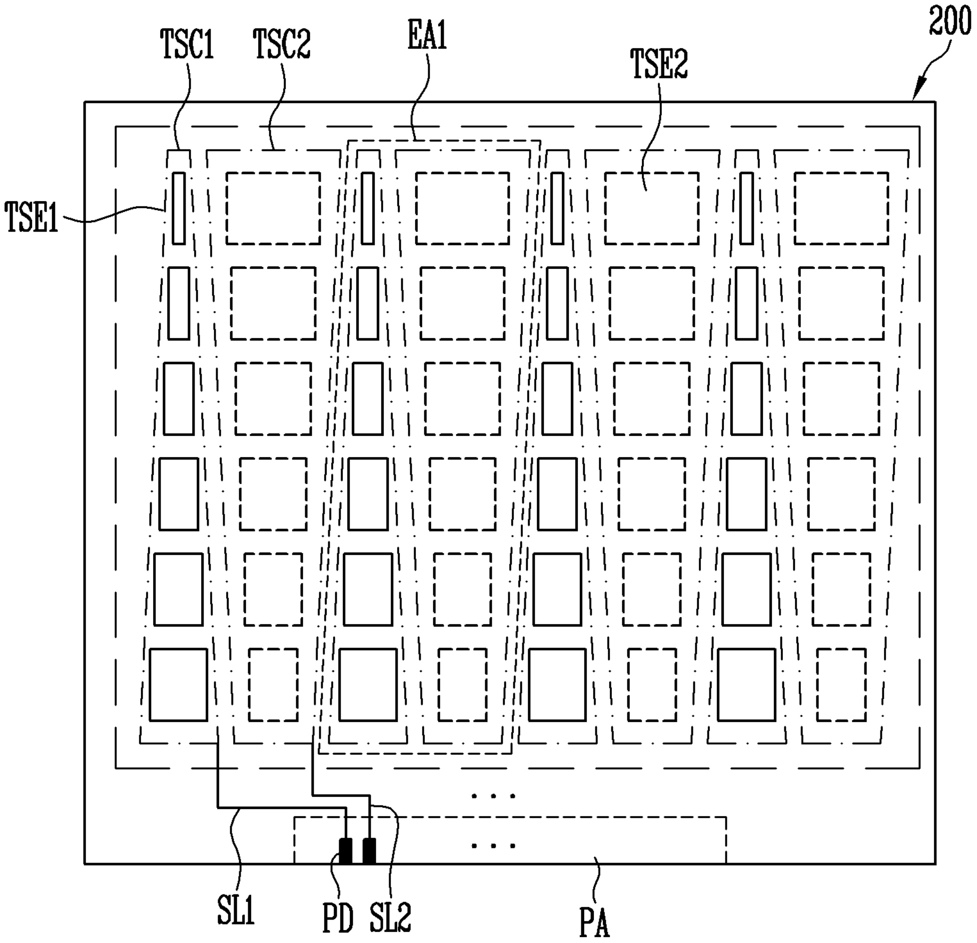
FIG. 9 is a schematic plan view of a third embodiment of a first sensing electrode column and a third embodiment of a second sensing electrode column in a touch screen of a display device constructed according to the principles of the invention.
Figure 10:
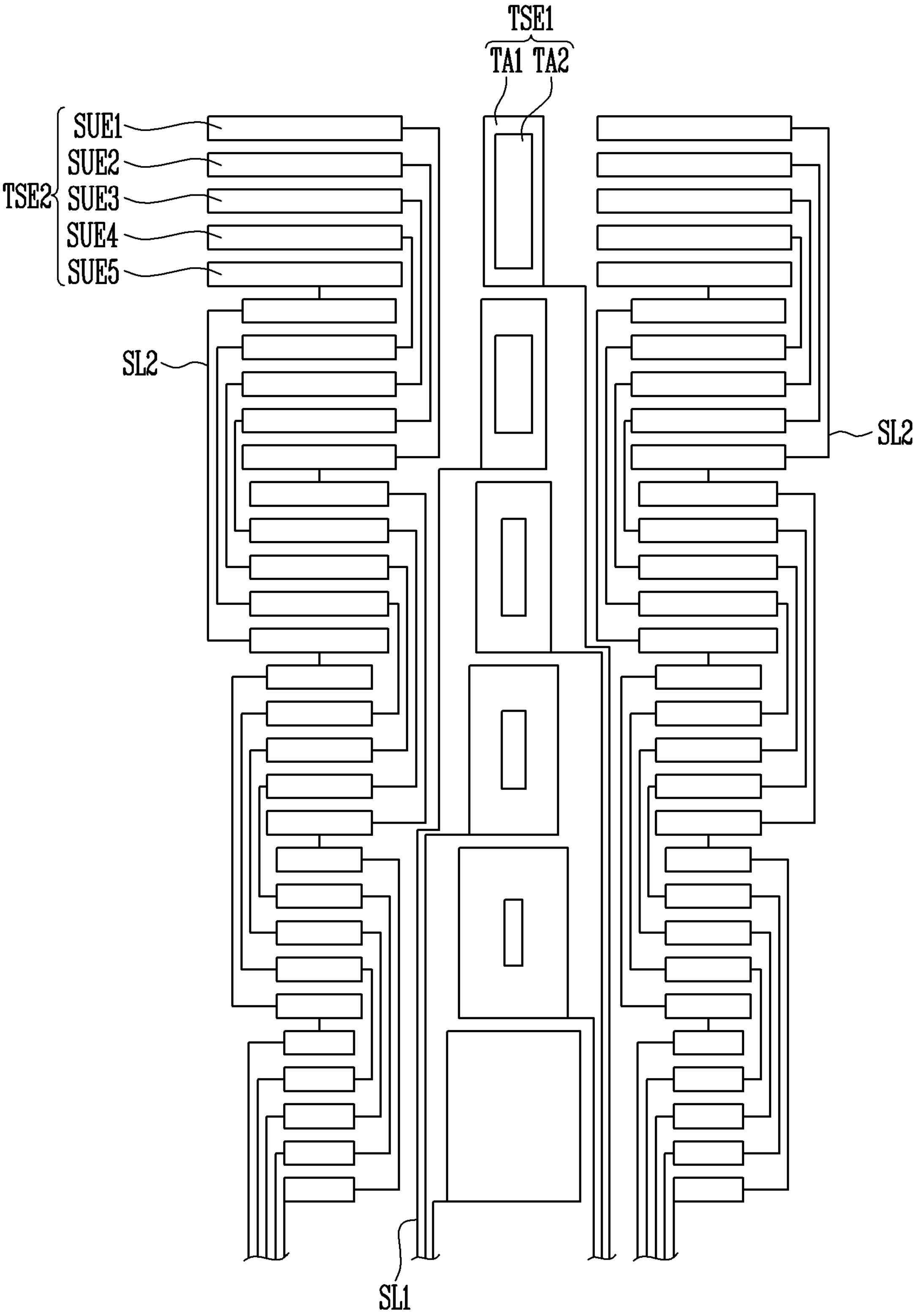
FIG. 10 is an enlarged, schematic plan view of the third embodiment of the first sensing electrode column and the third embodiment of the second sensing electrode column of the touch screen of the display device of FIG. 9.

Referring to FIGS. 9 and 10, the touch screen 200 may include a plurality of first sensing electrode columns TSC1 extending in one direction, the plurality of first sensing electrode columns TSC1 being substantially parallel to one another, and a plurality of second sensing electrode columns TSC2 extending in substantially parallel to the first sensing electrode columns TSC1, the plurality of second sensing electrode columns TSC2 being alternately disposed with the first sensing electrode columns TSC1.

The first sensing electrode columns TSC1 may include a plurality of first sensing electrodes TSE1. Each of the first sensing electrodes TSE1 may include a first region TA1 and a second region TA2, which are electrically separated from each other. One of the first region TA1 and the second region TA2 may be an electrically isolated region. For example, the second region TA2 is disposed in the first region TA1, and may have an electrically isolated island shape.

In each first sensing electrode column TSC1, areas of the first regions TA1 of adjacent first sensing electrodes TSE1 may be different from each other. For example, in the first sensing electrode column TSC1, an area of the first region TA1 of a first sensing electrode TSE1 disposed closer to the pad unit PA of adjacent first sensing electrodes TSE1 may be larger than that of the first region TA1 of a first sensing electrode TSE1 disposed farther from the pad unit PA. Therefore, in the first sensing electrode column TSC1, the area of the first region TA1 of a first sensing electrode TSE1 disposed the closest to the pad unit PA of the first sensing electrodes TSE1 may be the largest. Also, in the first sensing electrode column TSC1, the area of the first area TA1 of a first sensing electrode TSE1 disposed the farthest from the pad unit PA may be the smallest.

In the first sensing electrode column TSC1, areas of the second regions TA2 of the adjacent first sensing electrodes TSE1 may be different from each other. For example, in the first sensing electrode column TSC1, the area of the second region TA2 of a first sensing electrode TSE1 disposed closer to the pad unit PA of the adjacent first sensing electrodes TSE1 may be smaller than that of the second region TA2 of a first sensing electrode TSE1 disposed farther from the pad unit PA. Also, in the first sensing electrode column TSC1, the area of the second region TA2 of a first sensing electrode TSE1 disposed closest to the pad unit PA may be 0. That is, the first sensing electrode TSE1 disposed closest to the pad unit PA might not have the second region TA2.

The second sensing electrode columns TSC2 may include a plurality of second sensing electrodes TSE2. Each of the second sensing electrodes TSE2 may include a plurality of sub-electrodes SUE1, SUE2, SUE3, SUE4, and SUE5.

In each second sensing electrode column TSC2, areas of the sub-electrodes SUE1, SUE2, SUE3, SUE4, and SUE5 of adjacent second sensing electrodes TSE2 may be different from each other. For example, in the second sensing electrode column TSC2, the area of the sub-electrodes SUE1, SUE2, SUE3, SUE4, and SUE5 of a second sensing electrode TSE2 disposed closer to the pad unit PA of the adjacent second sensing electrodes TSE2 may be smaller than that of the sub-electrodes SUE1, SUE2, SUE3, SUE4, and SUE5 of a second sensing electrode TSE2 disposed farther from the pad unit PA. Therefore, in the second sensing electrode column TSC2, the area of the sub-electrodes SUE1, SUE2, SUE3, SUE4, and SUE5 of a second sensing electrode TSE2 disposed the closest to the pad unit PA of the second sensing electrodes TSE2 may be the smallest. Also, in the second sensing electrode column TSC2, the area of the sub-electrodes SUE1, SUE2, SUE3, SUE4, and SUE5 of a second sensing electrode TSE2 disposed the farthest from the pad unit PA of the second sensing electrodes TSE2 may be the largest.

As described above, according to the principles of the invention, the number of sensing lines disposed between sensing electrodes is decreased, thereby improving the touch sensitivity of the touch screen. In addition, it is possible with the various disclosed sensor configurations to prevent touch sensitivities from being varying according to various regions of the touch screen.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A touch screen comprising:
a plurality of first sensing electrode columns including a plurality of first sensing electrodes, the plurality of first sensing electrode columns extending in one direction; and
a plurality of second sensing electrode columns alternately disposed with the first sensing electrode columns, the plurality of second sensing electrode columns including a plurality of second sensing electrodes having a plurality of sub-electrodes,
wherein:
at least some of the first sensing electrodes include a first region and a second region electrically separated from the first region;
the second region is disposed in the first region, and is electrically isolated from the first region; and
in at least some of the first sensing electrode columns, an area of the second region of the first sensing electrodes is gradually increased in a direction toward an other end of the first sensing electrode column from one end of the first sensing electrode column.

2. The touch screen of claim 1, wherein, in at least some of the first sensing electrode columns, an area of the second region of one of adjacent first sensing electrodes is smaller than an area of the second region of another of the adjacent first sensing electrodes.

3. The touch screen of claim 2, wherein an area of the second region of the first sensing electrode disposed at the one end of the first sensing electrode column is smaller than an area of the second region of the first sensing electrode disposed at the other end of the first sensing electrode column.

4. The touch screen of claim 3, wherein, in the first sensing electrode column, areas of adjacent first sensing electrodes are different from each other, and
wherein, in at least some of the second sensing electrode columns, areas of adjacent second sensing electrodes are different from each other.

5. The touch screen of claim 4, further comprising a pad unit including a plurality of pads electrically connected to the sub-electrodes of the second sensing electrodes and the first sensing electrodes,
wherein, in the first sensing electrode column, an area of the first sensing electrode disposed proximal to the pad unit is larger than that of the first sensing electrode disposed distant from the pad unit, and
wherein, in the second sensing electrode column, an area of the second sensing electrode disposed proximal to the pad unit is smaller than that of the second sensing electrode disposed distant from the pad unit.

6. The touch screen of claim 1, wherein at least some of the sub-electrodes include a third region and a fourth region electrically separated from the third region.

7. The touch screen of claim 6, wherein the fourth region is disposed in the third region, and is electrically isolated from the third region.

8. The touch screen of claim 7, wherein, in at least some of the second sensing electrode columns, an area of the fourth region of the sub-electrodes of one of adjacent second sensing electrodes is smaller than an area of the fourth region of the sub-electrodes of another of the adjacent second sensing electrodes.

9. The touch screen of claim 8, wherein an area of the fourth region of the sub-electrodes of the second sensing electrode disposed at one end of the second sensing electrode column is smaller than an area of the fourth region of the sub-electrodes of the second sensing electrode disposed at the other end of the second sensing electrode column.

10. The touch screen of claim 9, further comprising a pad unit including a plurality of pads electrically connected to the sub-electrodes of the second sensing electrodes and the first sensing electrodes, and
wherein the one end of the second sensing electrode column is an end disposed proximal to the pad unit in the second sensing electrode column, and the other end of the second sensing electrode column is an end disposed distant from the pad unit in the second sensing electrode column.

11. The touch screen of claim 10, wherein an area of the fourth region of the sub-electrodes of the second sensing electrode disposed at the one end of the second sensing electrode column is approximately 0.

12. The touch screen of claim 1, wherein, in at least some of the second sensing electrode columns, the second sensing electrodes include n (where n is a natural number of 2 or more) sub-electrodes,
wherein a jth (where j is a natural number of n or less) sub-electrode of one of adjacent second sensing electrodes and an (n−j+1)th sub-electrode of another of the adjacent second sensing electrodes are electrically connected to each other through a sensing line.

13. The touch screen of claim 1, further comprising a dummy pattern disposed between the first sensing electrode columns and the second sensing electrode columns.

14. A touch screen comprising:
a plurality of first sensing electrode columns including a plurality of first sensing electrodes, the plurality of first sensing electrode columns extending in one direction; and
a plurality of second sensing electrode columns alternately disposed with the first sensing electrode columns, the plurality of second sensing electrode columns including a plurality of second sensing electrodes having a plurality of sub-electrodes,
wherein:
at least some of the first sensing electrodes include a first region and a second region electrically separated from the first region;
the second region is disposed in the first region, and is electrically isolated from the first region; and
in at least some of the first sensing electrode columns, an area of the second region of the first sensing electrode disposed proximal to one end of the first sensing electrode column is smaller than an area of the second region of the first sensing electrode disposed distant from the one end of the first sensing electrode column, in a direction toward an other end of the first sensing electrode column from the one end of the first sensing electrode column.

15. The touch screen of claim 14, wherein the second region includes a plurality of electrically separated sub-regions.

16. The touch screen of claim 15, wherein, in each of the first sensing electrode columns, a sum of areas of the sub-regions of one of adjacent first sensing electrodes is different from a sum of areas of the sub-regions of another of the adjacent first sensing electrodes.

17. The touch screen of claim 16, further comprising a pad unit including a plurality of pads electrically connected to the sub-electrodes of the second sensing electrodes and the first sensing electrodes, and wherein, in the first sensing electrode column, a sum of areas of the sub-regions of the first sensing electrode disposed proximal to the pad unit is larger than that of areas of the sub-regions of the first sensing electrode disposed distant from the pad unit.

18. A touch screen comprising:

a plurality of first sensing electrode columns including a plurality of first sensing electrodes, the plurality of first sensing electrode columns extending in one direction;

a plurality of second sensing electrode columns alternately disposed with the first sensing electrode columns, the plurality of second sensing electrode columns including a plurality of second sensing electrodes having a plurality of sub-electrodes; and a pad unit including a plurality of pads electrically connected to the sub-electrodes of the second sensing electrodes and the first sensing electrodes, wherein at least some of the first sensing electrodes include a first region and a second region electrically separated from the first region, wherein an area of the second region of the first sensing electrode disposed at one end of the first sensing electrode column is smaller than an area of the second region of the first sensing electrode disposed at the other end of the first sensing electrode column, and wherein the one end of the first sensing electrode column is an end proximal to the pad unit in the first sensing electrode column, and the other end of the first sensing electrode column is an end distant from the pad unit in the first sensing electrode column.

19. The touch screen of claim 18, wherein the area of the second region of the first sensing electrode disposed at the one end of the first sensing electrode column is approximately 0.

* * * * *